United States Patent [19]

Foers

[11] 3,910,392

[45] Oct. 7, 1975

[54] CLUTCHES WITH SPRING WIRE TORQUE TRANSMITTING MEMBERS

[75] Inventor: John Arthur Foers, Braithwell, near Rotherham, England

[73] Assignee: GKN Transmissions Limited, Birmingham, England

[22] Filed: Dec. 28, 1973

[21] Appl. No.: 429,354

[30] Foreign Application Priority Data
Jan. 2, 1973 United Kingdom................. 200/73

[52] U.S. Cl. ....... 192/70.18; 192/70.17; 192/70.28; 192/89 B
[51] Int. Cl.² ................. F16D 13/50; F16D 13/68
[58] Field of Search ........... 192/70.28, 89 R, 89 B, 192/109 A, 106.1, 70.29, 70.17, 70.18, 70.27

[56] References Cited
UNITED STATES PATENTS

| | | | |
|---|---|---|---|
| 1,706,435 | 3/1929 | Borg | 192/70.28 |
| 1,921,315 | 8/1933 | Hughes | 192/70.29 X |
| 1,983,885 | 12/1934 | Spase | 192/70.28 X |
| 2,195,664 | 4/1940 | Wolfram | 192/70.28 |
| 2,765,892 | 10/1956 | Reed | 192/89 R X |
| 3,306,407 | 2/1967 | Smirl | 192/89 B |

*Primary Examiner*—Samuel Scott
*Assistant Examiner*—John Reep
*Attorney, Agent, or Firm*—Merriam, Marshall, Shapiro & Klose

[57] ABSTRACT

A friction clutch assembly for use in combination with a driving clutch plate and a driven clutch plate comprising a cover adapted for securement to the driving plate and containing a pressure plate and a spring means urging the latter towards the driven plate to clamp the driven plate between the pressure and driving plates, and wherein for transmitting torque between the cover and pressure plate resilient torque transmitting members made of spring wire are connected between the cover and pressure plate and include attachment portions subjected to torsional and/or bending strain to provide push-off force to assist movement of the pressure plate axially of the clutch to a disengaging position.

11 Claims, 6 Drawing Figures

CLUTCHES WITH SPRING WIRE TORQUE TRANSMITTING MEMBERS

BACKGROUND OF THE INVENTION

1. Field of the Invention

This invention relates to friction clutches.

More particularly the invention relates to an assembly which in use forms part of a friction clutch and comprises a pressure plate, a cover, spring means interposed between the pressure plate and the cover, and torque transmitting resilient members interconnecting the cover and the pressure plate, the resilient members serving to transmit rotary drive between the cover and the pressure plate and, by virtue of their resiliency, accommodating movement of the pressure plate parallel to the rotary axis of the assembly between clutch engaged and clutch disengaged positions relatively to the cover. Hereinafter such assemblies are referred to as being clutch assemblies of the kind specified.

2. Description of the Prior Art

In clutch assemblies of the kind specified the resilient members heretofore employed have been in the form of resilient metal strips arranged with the wider dimension of the strip lying in a plane normal to the clutch axis (i.e. generally parallel to the pressure plate). In certain arrangements of this kind the strips have had their opposite ends connected respectively to the pressure plate and to the cover and, depending upon the arrangement of strips, have operated in tension or compression during drive and compression or tension during overrun of the clutch respectively. In other arrangements both ends of the strips have been connected to the cover and mid portions of the strips have been connected to the pressure plate, in this arrangement one half of the strip being stressed in tension and the other half in compression during drive and the situation being vice versa during overrun. Whilst, so far as transmission of torque is concerned, these arrangements have operated satisfactorily, they do have certain disadvantages.

Firstly, the production cost involved in making the resilient strips and assemblying them in the correct positions and in securing them to the cover and to the pressure plate are comparatively high. Further, because of the attitude of the strips, i.e. their arrangement with their width dimension lying in a plane parallel to the pressure plate, the strips themselves encroach on the central region of the assembly where space is required to accommodate the hub member or assembly of the driven plate.

Further, when the spring means is a diaphragm spring, it is necessary for the strips to have an "intersecting" relation with an interrupted annular fulcrum or pivot rib on the pressure plate because the strips are too wide to be accommodated wholly outwardly of the rib and the inner ends of the strips are thus necessarily connected to the pressure plate inwardly of this rib. The gaps between successive sections of the annular rib thus have to be made long enough to accommodate the strip when intersecting obliquely with the rib. The longer these gaps are, the less satisfactory is the rib in performing its fulcrum or pivot duty.

One object of the present invention is to provide an improved construction whereby one or more of these disadvantages may be overcome or mitigated.

SUMMARY OF THE INVENTION

According to the invention there is provided an assembly for use in a friction clutch comprising a cover, a pressure plate, spring means for urging the pressure plate relatively axially of said cover from a clutch disengaged position to a clutch engaged position, torque transmitting means interconnecting said cover and said pressure plate and including a plurality of torque transmitting members formed of spring wire.

Spring wire is not only considerably less expensive than the resilient strips which have heretofore been used, but operates satisfactorily to transmit torque between the cover and the pressure plate. Further, because its dimensions in transverse cross-section do not differ greatly in any direction and are substantially less than the width of the resilient strips heretofore employed, it becomes possible to accommodate the resilient members in the annular space situated outwardly of the fulcrum rib of the pressure plate, or alternatively, if such rib is intersected, then the gaps provided therein for the passage of the resilient members can be made much shorter than has been the case for the resilient strip members.

A further function that has heretofore been performed by certain forms of resilient strip which have been employed has been to exert a push-off force on the pressure plate to move it towards its clutch disengaged position when the force exerted thereon by the diaphragm spring has been relieved by operation of the clutch release mechanism. This has been contrived by fixedly securing the ends of the resilient strip to the cover member at points which are spaced apart by a distance which is less than the natural length of the intervening portion of the resilient strip, the latter, however, being constrained to flat configuration between these fixing points by virtue of the force exerted by the diaphragm spring when the pressure plate is in its clutch engaged position. To enable the resilient strips to undergo flattening in this mode they have been made of corrugated form, the corrugations running transversely to the length of the strips. Whilst this arrangement has provided satisfactory push-off force, the formation of the resilient strips to the precise configuration required has materially increased their cost of manufacture as has also maintenance of the tolerances in the spacings of the fixing points on the cover.

A further object of the present invention is to provide an improved arrangement which will provide a satisfactory level of push-off force without incurring the manufacturing costs entailed in the prior arrangement described in the preceding paragraph.

Thus, according to a further aspect, the invention resides in the provision in a friction clutch assembly comprising a pressure plate, a cover, spring means acting therebetween to urge the pressure plate from a clutch disengaged to a clutch engaged position, and resilient torque transmitting members interconnecting said pressure plate and said cover, of the improvement wherein said torque transmitting members are formed of spring wire, each torque transmitting member incorporates two arms and attachment portions located respectively at outer ends of said arms and between adjacent inner ends of said arms which are thereby connected to each other at said inner ends, said attachment portions are interconnected with said pressure plate and said cover in a configuration to transmit longitudinal tension to one of said arms and longitudinal compression to the other of said arms during transmission of torque through said assembly, one at least of said attachment portions has a configuration such as to be strained elastically upon movement of said pressure plate into its clutch engaged position, and thereby to exert a push-off force on said pressure plate to assist clutch disengagement upon relief of pressure exerted by said spring means on said pressure plate.

The attachment portion of each such resilient member, which interfits with the cover, may be that which is situated between, and serves to join, the two arms, this attachment portion incorporating one or more limbs which are strained in torsion and/or bending to provide the required push-off force when the pressure plate is in its clutch engaged position.

Due to the contrast in transverse cross-sectional dimensions of a resilient metal strip, the width of which is a plurality of times greater than its thickness, there are practical limitations as to the configuration into which such resilient strip may be bent and there are, therefore, practical limitations as to the number of modes in which different portions of a given resilient strip may be strained to perform different functions. By utilisation of wire to form the resilient members there is no such limitation since the wire can readily be bent into complex configurations without difficulty, such configurations being selected to establish different modes of straining to perform the respective functions desired, namely torque transmission and the generation of push-off force.

BRIEF DESCRIPTION OF THE DRAWINGS

The invention will now be described, by way of example, with reference to the accompanying drawings wherein.

DESCRIPTION OF THE PREFERRED EMBODIMENT

Figure 1:
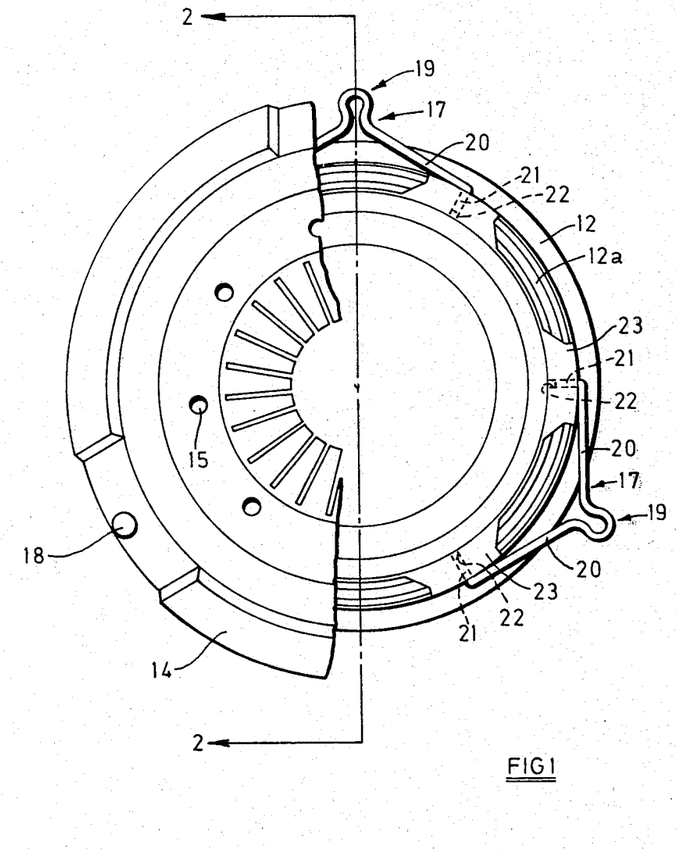
FIG. 1 shows a clutch incorporating an assembly of the kind specified in accordance with one embodiment of the invention, such clutch being shown in end elevation with the clutch cover partly broken away.
Figure 2:
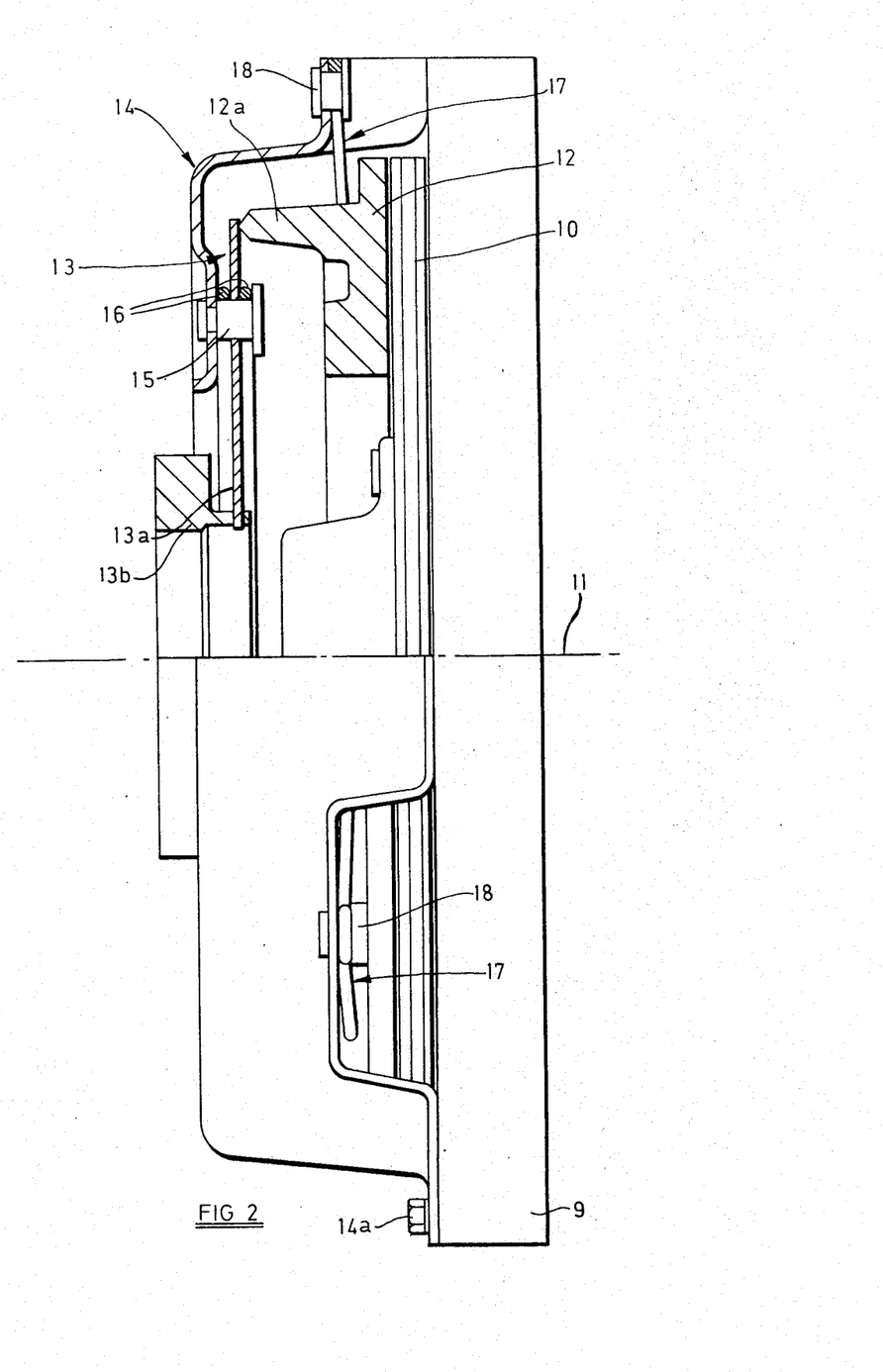
FIG. 2 shows the assembly of FIG. 1 in side elevation and partly in cross-section on the line 2—2 of FIG. 1.

Referring to the embodiment of FIGS. 1 and 2, the complete clutch comprises a driving plate which may be the flywheel of an internal combustion engine, for example in a motor road vehicle, a driven plate 10 which is normally carried on the input shaft of a gear box for rotation about an axis 11 of the clutch, a cover 14 secured peripherally by bolts 14a to the driving plate, a pressure plate 12 movable axially within the cover plate to clamp the driven plate between the driving plate and pressure plate or to release the driven plate according to whether the clutch is engaged or disengaged, and a diaphragm spring 13 secured to the cover by means of a series of circumferentially spaced rivets 15 carrying fulcrum rings 16 on opposite sides of the diaphragm spring to define a fulcrum therefor.

In the position shown, wherein it is assumed that the cover 14 has been bolted to the driving plate, the diaphragm spring is constrained to adopt a planar form with its outer peripheral margin bearing against an annular rib 12a on the pressure plate and its inner peripheral margin presented by the inner ends of a plurality of radially inwardly projecting fingers 13a and carrying a release ring 13b spaced axially from the thrust race or block of a release mechanism not shown.

As the sole means for transmitting torque between the cover 14 and the pressure plate, a plurality of resilient members 17 are provided each formed of spring wire preferably of circular cross-section. Each such resilient member is secured to an outer peripheral portion of the cover 14 by means of a rivet 18 which for this purpose passes through the aperture afforded by an attachment portion 19 of the resilient member, serving also as the junction between two substantially rectilinear arms 20 which extend from the attachment portion 19 in opposite circumferential directions.

At the outer or free ends of the arms 20 the resilient member incorporates further attachment portions 21 each of which is constituted by a short length of the wire bent approximately at right angles to the length of the arm to project towards the axis 11. The attachment portions 21 are received within respective sockets 22 formed in bosses 23 having their outer ends flush with, or projecting slightly beyond, the annular rib 12a. The sockets lie in a plane generally normal to the axis 11, and, as shown, are radial to such axis. The dimensional relationships between the resilient members and the attachment formations such as the rivets 18 on the cover member and the sockets 22 in the pressure plate are illustrated in FIG. 3.

Figure 3:
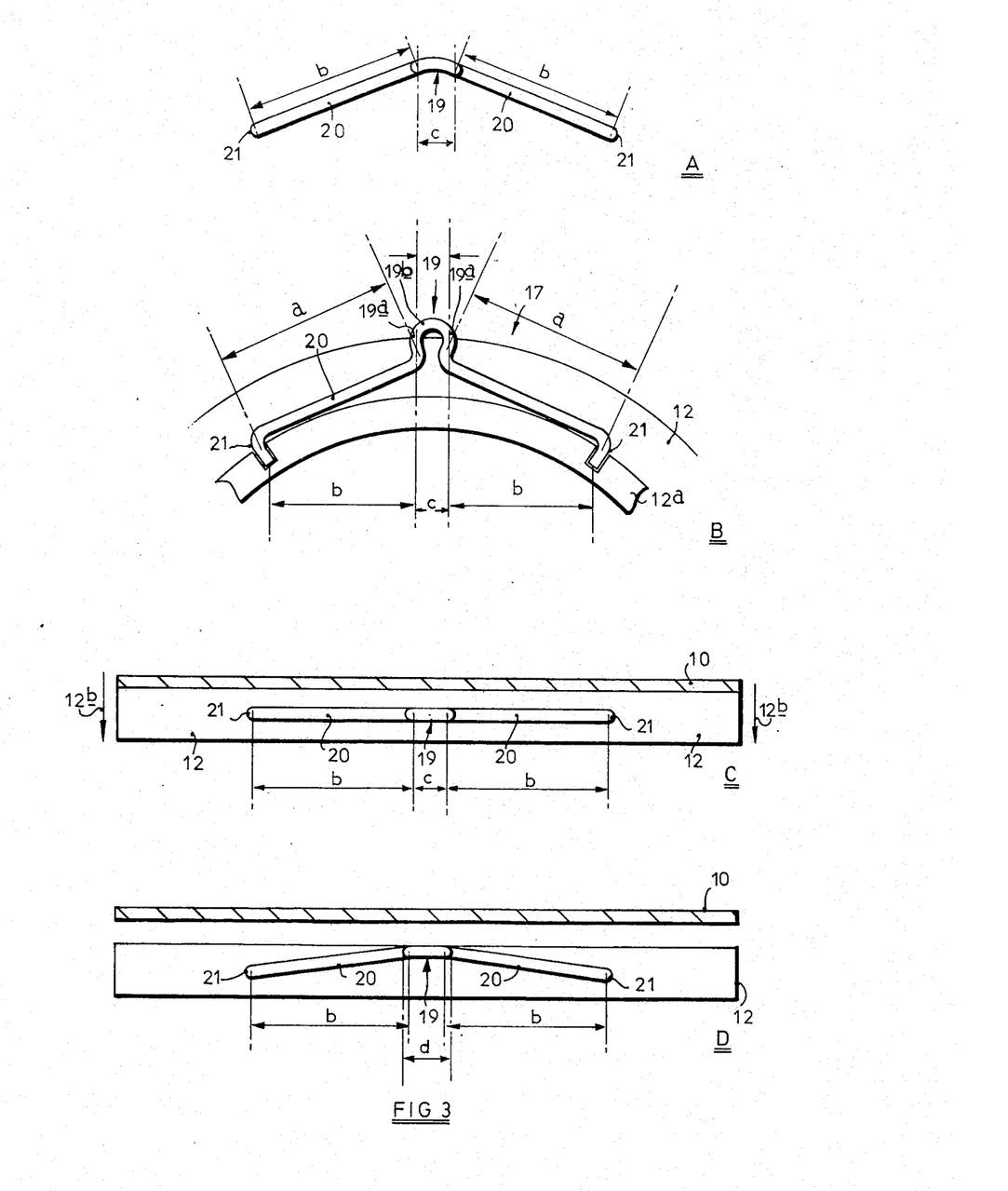
FIG. 3 is a diagrammatic view illustrating the relationship between the dimensions of a resilient member incorporated in the clutch of FIGS. 1 and 2 and the spacings of the formations on the cover and pressure plate with which the attachment portions of this resilient member are engaged.

Referring firstly to section B of FIG. 3, the length of each arm 20 is $a$ and this length projected onto a horizontal plane, when the resilient element is in its topmost position, has a dimension $b$ as will be seen from section A which shows the resilient element in its natural or unstressed configuration as viewed in plan.

The spacing apart of the two vertical limbs 19a of the attachment portion 19 is $c$ and the distance projected onto a horizontal plane between the centre lines of the sockets 22 is $2b + c$.

To assemble the resilient member 17 it is first subjected to bending force to convert it from the bowed configuration, as viewed in plan in section A, to planar form as viewed in section C, whereupon it will be found that the spacing of the attachment portions 21 will coincide precisely with the spacing of the sockets 22 thereby permitting of entry of the attachment portions 21 therein. If the cover member is bolted to the driving plate the resilient member 17 is constrained to the configuration shown in section C, but due to its tendency to resume its natural or unstressed configuration in plan as shown in section A, the attachment portions 21 will be exerting push-off force on the pressure plate 12 in the direction of the arrow 12b tending to separate the pressure plate from the driven plate 10.

Section D of FIG. 3 illustrates the disengaged position of the pressure plate 12, the resilient member having then partially reverted to the bowed configuration of section A.

In this condition the dimension c will slightly widen to the dimension of d since, although the sockets 22 will still be the same distance apart, the attachment portion 19 of the resilient element will be offset from the plane containing these sockets.

The elastic strain generating the push-off force is derived mainly from torsional strain in the limbs 19a of the attachment portion 19 but to some extent from bending strain in the connecting limb 19b. The limbs define a loop lying in a plane generally parallel to the pressure plate.

There will, of course, also be bending strain in the arms 20 contributing, to some extent, to the push-off force.

Due to the higher stresses in the attachment portion 19 most of the strain will be accommodated, however, by way of torsion in the limbs 19a and by way of bending in the limb 19b to the extent to which the mode of fixture of the portion 19b permits of bending in this limb.

It will be evident that the whole of the resilient member 17 is accommodated in an annular space outwardly of the rib 12a and there is, therefore, no encroachment upon the inner space required for the accommodation of other component parts of the clutch, for example the hub or hub assembly of the driven plate.

Figure 4:
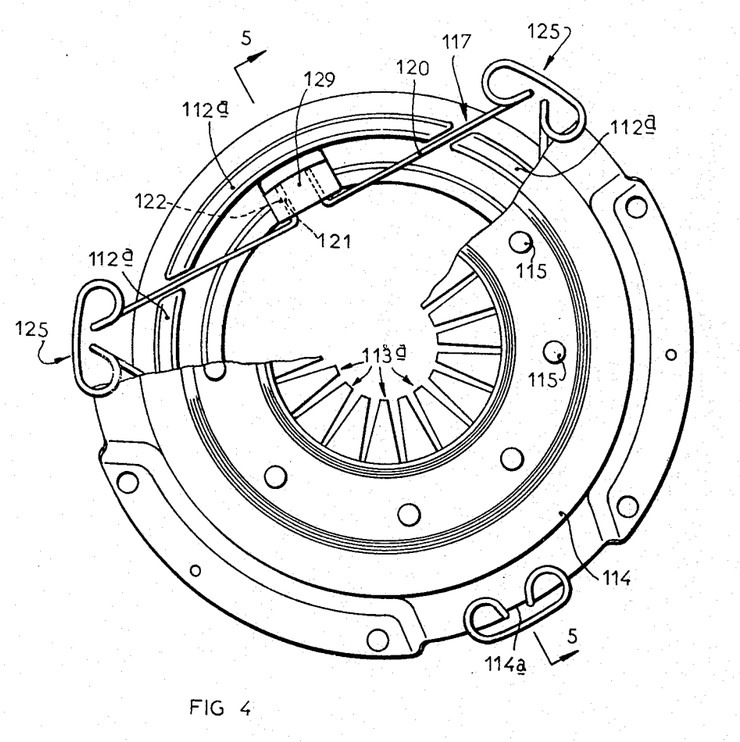
FIG. 4 is a view in end elevation showing an alternative embodiment in accordance with the present invention, again part of the clutch cover being broken away.
Figure 5:
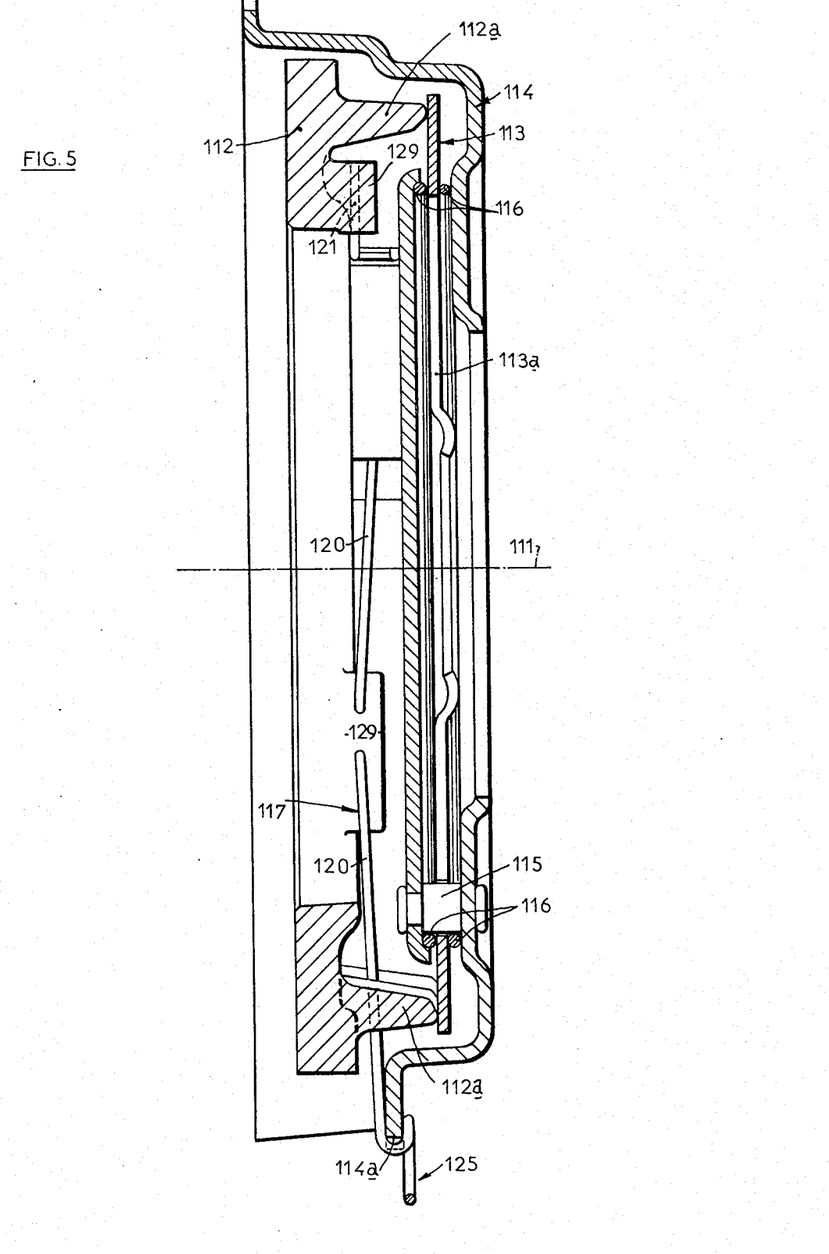
FIG. 5 is a cross-sectional view on the line 5—5 of FIG. 4.
Figure 6:
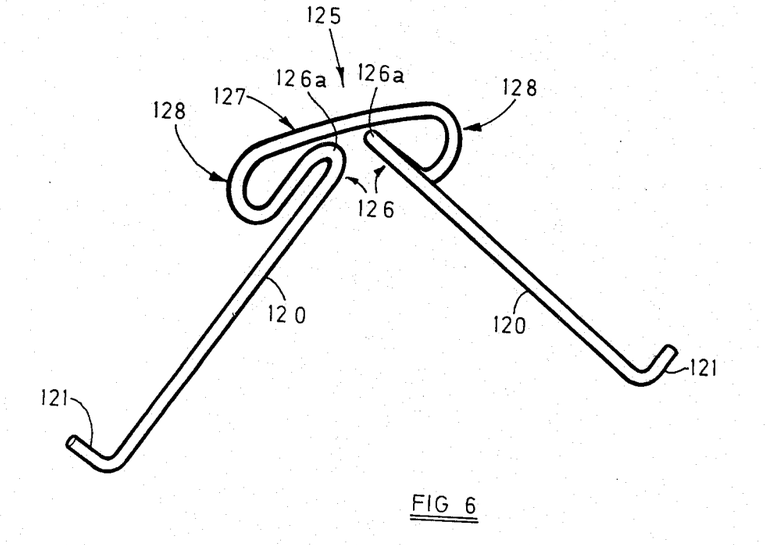
FIG. 6 is a perspective view showing one of the resilient members incorporated in the assembly of FIGS. 4 and 5.

In the embodiment illustrated in FIGS. 4, 5 and 6, parts corresponding functionally to those already described are designated by like reference numerals with a prefix 1 and the preceding description is to be deemed to apply.

In this embodiment the resilient members again incorporate two arms 120 of substantially rectilinear form integrally connected at their outer ends to attachment elements 121 which, however, instead of projecting radially inwardly, project radially outwardly.

The central attachment portion 125 differs substantially in that it includes two U-shaped parts 126, one limb of each of which is in substantial alignment with, and joined integrally to, the adjacent end of an associated one of the arms 120, and the other limb of which is offset laterally from the arm 120 concerned in each case to the same side of such arm and is joined integrally to a connecting part 127 having C-shaped terminations 128.

The peripheral margin of the cover 114 includes a slot 114a having its mouth projecting radially outwardly within which the connecting limbs 126a of the two U-shaped parts are received, the ends of this slot forming abutments which engage the limbs 126a to transmit the requisite torque by way of longitudinal tension or compression as the case may be along the arms 120 to the attachment portions 121 and thence to the pressure plate 112.

The push-off force is derived predominantly from bending strain applied as between the limbs of the U-shaped parts 126. In the assembled condition these limbs are constrained to move towards each other and they tend to separate to their natural or unstressed condition and thereby move the pressure plate towards the cover member and away from the driven plate.

In both embodiments the attachment portions 21 and 121 are free to rotate in their respective sockets so that such movement brought about by the push-off force is not impeded.

The sockets 122 in the embodiment of FIGS. 4 and 5 are formed at the inner faces of bosses 129 situated inwardly of the interrupted annular rib 112a of the pressure plate.

Due, however, to the relatively small cross-sectional dimensions of the wire, the gaps between successive sections of the rib 12a can be made relatively short, preferably sufficient only to permit of passage of the arms 120 with slight clearance. Therefore, the rib 112a as a whole is able to perform its pivot or fulcrum function in acting as the means whereby force is transmitted from the diaphragm spring to the pressure plate without being adversely affected by the gaps. Further, because of the small cross-sectional dimension of the wire, there is very little encroachment on the interior space within the annular rib 112a so that, despite the positioning of part of the arms 120 in this space, they do not encroach upon that required for other purposes such as those previously mentioned.

Because the sockets 22 and 122 lie in planes normal to the clutch axis, e.g. extend radially in the pressure plate, the problem of maintaining effective anchorage between these sockets and the attachment portions 21 and 121 with respect to transmission of push-off force axially to the pressure plate is simplified in comparison with the conventional arrangement referred to wherein strip-like members require to be secured to the pressure plate. In the latter case such securement has to be effected by means of rivets in blind holes, i.e. holes which do not extend fully through the pressure plate, otherwise there would be discontinuities in the clamping face which engages frictionally with the driving plate. The securement of rivets in blind holes with that degree of security necessary to ensure reliable transmission of pull-off force is thus eliminated by the novel geometry of the present arrangement.

The dimensional relationships between the sockets 122 and the length of the arms 120 for the resilient member 117 can be equivalent to those already described with reference to the diagrammatic illustrations of FIG. 3. Thus, when the arms 120 are substantially coplanar under the constraint provided by the pressure plate and cover when the latter is bolted up to the driving plate and the pressure plate is in its clutch engaged position, the distance between the attachment portions 121 should be exactly the same as the distance between the sockets 122, so that the portions 121 can readily be inserted into the sockets and the straining of the resilient member 117 is then predominantly bending strain in the U-shaped parts 126 with some possible torsional strain in the C-shaped parts 128.

A suitable spring wire which can be utilised for the formation of the resilient members 17 and 117 is that made from steel of the designation EN47b which has a carbon content between 0.45 and 0.85%. The wire may be of circular cross-section having a diameter of 2mm. but the size of the wire can be varied in dependence upon the duty that the assembly has to perform. Further, although wire of circular cross-section is preferred, wire of other cross-sectional shape such as elliptical or square may be utilised if desired, in the latter case however freedom being provided by appropriate clearance for rotation of the attachment portions 21 and 121 in their respective sockets.

It will be noted that in both of the embodiments described and illustrated one of the arms 20 or 120 will always be in tension whether the clutch is transmitting drive or overrun, and the other of the arms will be in compression. The resultant of these two forces applied to the attachment portion 19 or 125 forming the two arms will be in a direction tangential to the cover member so that there will be no tendency to dislodge the attachment portion in an outward radial direction from the cover.

Any resultant turning moment exerted on the attachment portion 19 or 125 by the tensile and compressive forces in the arms 20 or 120 will be resisted by bending stress set up in the arms themselves. The attachment portion 19 is also subjected to constraint against turning in its own plane by its rivetted connection to the cover. In the case of attachment portion 125, the parts 127 and the offset limbs of the parts 126 lie on one side of the peripheral flange of the cover while the limbs of the parts 126, which are in alignment with arms 120, lie on the opposite side of the cover so that in effect the cover provides constraint against any movement of attachment portion both in a direction normal to the cover flange and by virtue of the slot 114a in the plane of the cover flange.

I claim:

1. An assembly for use in a friction clutch comprising:
   a. a cover,
   b. a pressure plate,
   c. spring means for urging the pressure plate relatively axially of said cover from a clutch disengaged position to a clutch engaged position,
   d. torque transmitting means interconnecting said cover and said pressure plate and including a plurality of torque transmitting members formed of spring wire, said spring wire torque transmitting members being the only means for transmitting rotational torque from the cover to the pressure plate in a clutch disengaged position.

2. An assembly according to claim 1 wherein:
   a. said spring means comprises a diaphragm spring member engaged between respective rib means defining annular fulcra or pivots on said cover and on said pressure plate,
   b. said torque transmitting members are positioned in an outer zone lying between said rib means on said pressure plate and the outer periphery of said cover.

3. An assembly according to claim 1 wherein:
   a. said spring means comprises a diaphragm spring member engaged between respective rib means defining annular fulcra or pivots on said cover and on said pressure plate,
   b. said torque transmitting members are mounted in positions to intersect obliquely with said rib means on said pressure plate,
   c. said rib means has gaps between successive sections of said rib means sufficient in length only to provide for clearance passage of said torque transmitting members therethrough.

4. In a friction clutch assembly comprising a pressure plate, a cover, spring means acting therebetween to urge the pressure plate from a clutch disengaged to a clutch engaged position, and resilient torque transmitting members interconnecting said pressure plate and said cover, the improvement wherein:
   a. said torque transmitting members are formed of spring wire,
   b. each torque transmitting member incorporates two arms and attachment portions located respectively at outer ends of said arms and between adjacent inner ends of said arms which are thereby connected to each other at said inner ends,
   c. said attachment portions are interconnected with said pressure plate and said cover in a configuration to transmit longitudinal tension to one of said arms and longitudinal compression to the other of said arms during transmission of torque through said assembly,
   d. one at least of said attachment portions has a configuration such as to be strained elastically upon movement of said pressure plate into its clutch engaged position, and thereby to exert the push-off force on said pressure plate to assist clutch disengagement upon relief of pressure exerted by said spring means on said pressure plate,
   e. said spring wire torque transmitting members are the only means for transmitting rotational torque from the cover to the pressure plate in a clutch disengaged position.

5. The improvement claimed in claim 4 wherein:
   a. the elastically strained attachment portion is that serving to connect said inner ends of said arms to each other,
   b. the last said attachment portion incorporates limbs strained elastically in torsion.

6. The improvement claimed in claim 4 wherein:
   a. the elastically strained attachment portion is that serving to connect said inner ends of said arms to each other,
   b. the last said attachment portion incorporates limbs strained elastically in bending.

7. The improvement claimed in claim 4 wherein:
   a. the elastically strained attachment portion is that serving to connect said inner ends of said arms to each other,
   b. the last said attachment portion incorporates at least one limb strained elastically in torsion and at least one limb strained elastically in bending.

8. The improvement claimed in claim 4 wherein:
   a. the elastically strained attachment portion is that serving to connect said inner ends of said arms to each other,
   b. the last said attachment portion comprises two limbs connected respectively to said inner ends of said arms and extending therefrom transversely to the lengths of said arms in side-by-side relation, and a third limb connecting said two limbs at their ends remote from said arms,
   c. said two limbs and said third limb defining a loop in a plane generally parallel to said pressure plate.

9. The improvement claimed in claim 4 wherein:
   a. the elastically strained attachment portion is that serving to connect said inner ends of said arms to each other,
   b. the last said attachment portion comprises two U-shaped parts each having one limb connected to a respective one of said inner ends of said arms each in substantial alignment with the arm concerned, and the other limb offset laterally from said arm concerned in each case to the same side thereof, and a connecting part joining said other limbs to each other,
   c. said U-shaped parts interfitting with a portion of said cover.

10. The improvement claimed in claim 4 wherein:

a. said attachment portions at said outer ends of said arms each comprise a length of the wire bent relatively to said arm to project transversely thereof,
b. said pressure plate includes openings extending in a plane generally normal to said clutch axis for reception of said attachment portions.

11. The improvement claimed in claim 10 wherein said attachment portions at said outer ends of said arms are free to rotate in said openings in said pressure plate.

* * * * *